US008272621B2

(12) United States Patent
Finstad et al.

(10) Patent No.: US 8,272,621 B2
(45) Date of Patent: Sep. 25, 2012

(54) LONGITUDINAL BULGING SEAL FOR SPRAY GUN

(75) Inventors: Eric J. Finstad, Rogers, MN (US); Thomas E. Pauly, Zimmerman, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 298 days.

(21) Appl. No.: 12/600,685

(22) PCT Filed: May 30, 2008

(86) PCT No.: PCT/US2008/065220

§ 371 (c)(1), (2), (4) Date: Nov. 18, 2009

(87) PCT Pub. No.: WO2008/156990

PCT Pub. Date: Dec. 24, 2008

(65) Prior Publication Data

US 2010/0163771 A1 Jul. 1, 2010

Related U.S. Application Data

(60) Provisional application No. 60/943,951, filed on Jun. 14, 2007.

(51) Int. Cl.
*F16K 31/44* (2006.01)

(52) U.S. Cl. ........................... 251/64; 251/214; 277/585

(58) Field of Classification Search .................. 251/214, 251/64; 239/525, 526, 583, 414; 277/607, 277/585, 502

See application file for complete search history.

(56) References Cited

U.S. PATENT DOCUMENTS

| | | | | |
|---|---|---|---|---|
| 2,361,794 | A | 10/1944 | Pryor | |
| 2,567,527 | A | 9/1951 | Parks | |
| 3,168,320 | A | 2/1965 | Sneed | |
| 3,341,082 | A * | 9/1967 | Meshberg | 222/148 |
| 3,347,555 | A | 10/1967 | Norton | |
| 3,469,855 | A | 9/1969 | Enting | |
| 4,093,241 | A | 6/1978 | Muntjanoff et al. | |
| 4,143,883 | A | 3/1979 | Paynter | |
| 4,251,081 | A | 2/1981 | Skoog | |
| 4,342,447 | A | 8/1982 | Marx | |
| 4,481,974 | A * | 11/1984 | Schmitt et al. | 137/514 |
| 4,534,239 | A | 8/1985 | Heimann | |
| 4,553,564 | A | 11/1985 | Baram | |
| 4,917,390 | A | 4/1990 | Lee et al. | |
| 5,018,752 | A | 5/1991 | Thomas | |
| 5,265,843 | A * | 11/1993 | Kleinhappl | 251/129.17 |
| 5,741,228 | A * | 4/1998 | Lambrecht et al. | 604/288.01 |
| 5,779,224 | A * | 7/1998 | Fukano et al. | 251/331 |
| 6,105,931 | A * | 8/2000 | Frank et al. | 251/129.15 |
| 6,575,187 | B2 * | 6/2003 | Leys et al. | 137/15.21 |
| 6,830,231 | B2 * | 12/2004 | Paessler et al. | 251/64 |
| 2007/0013140 | A1 | 1/2007 | Kent et al. | |

* cited by examiner

*Primary Examiner* — John Bastianelli
(74) *Attorney, Agent, or Firm* — Douglas B. Farrow

(57) ABSTRACT

The seal (10) for a spray gun (20) is tubular in form and molded from an elastomer. The seal is placed in compression between two generally parallel surfaces (12) so as to seal out the fluid (such as paint) from the rod (14). As the trigger (16) is pulled and the rod (14) moved rearward, the seal (10) bulges to accommodate the travel without exposing the rod (14) to the fluid.

5 Claims, 5 Drawing Sheets

LONGITUDINAL BULGING SEAL FOR SPRAY GUN

TECHNICAL FIELD

This application claims the benefit of U.S. Application Ser. No. 60/943,951, filed on Jun. 14, 2007, the contents of which are hereby incorporated by reference.

BACKGROUND ART

Traditional seals in spray guns (particularly airless spray guns) have been of the type where the rod travels into and out of the fluid being sealed. This often results in fluid drying on the rod with the dried fluid abrading the seal resulting in premature seal failure and leakage.

DISCLOSURE OF THE INVENTION

The seal of the instant invention is tubular in form and molded from an elastomer. In the preferred embodiment, the seal is actually molded in two parts—inner and outer cylindrical tubes which are slip fit together. In the preferred embodiment, the outer tube is formed from a fluoroelastomer such as those sold under the trademark VITON while the inner tube is molded from a polyethylene elastomer. The seal is placed in compression between two generally parallel surfaces so as to seal out the fluid (such as paint) from the rod. As the trigger is pulled and the rod moved rearward (relative to the front/spraying end of the gun), the seal bulges to accommodate the travel.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

The seal of 10 the instant invention is tubular in form and molded from an elastomer. The needle assembly 16 is located in spray gun 20. In the preferred embodiment, the seal 10 is actually molded in two parts—inner 10*a* and outer 10*b* cylindrical tubes which are slip fit together. In the preferred embodiment, the outer tube 10*b* is formed from a fluoroelastomer such as those sold under the trademark VITON while the inner tube 10*a* is molded from a polyethylene elastomer.

Figure 1:
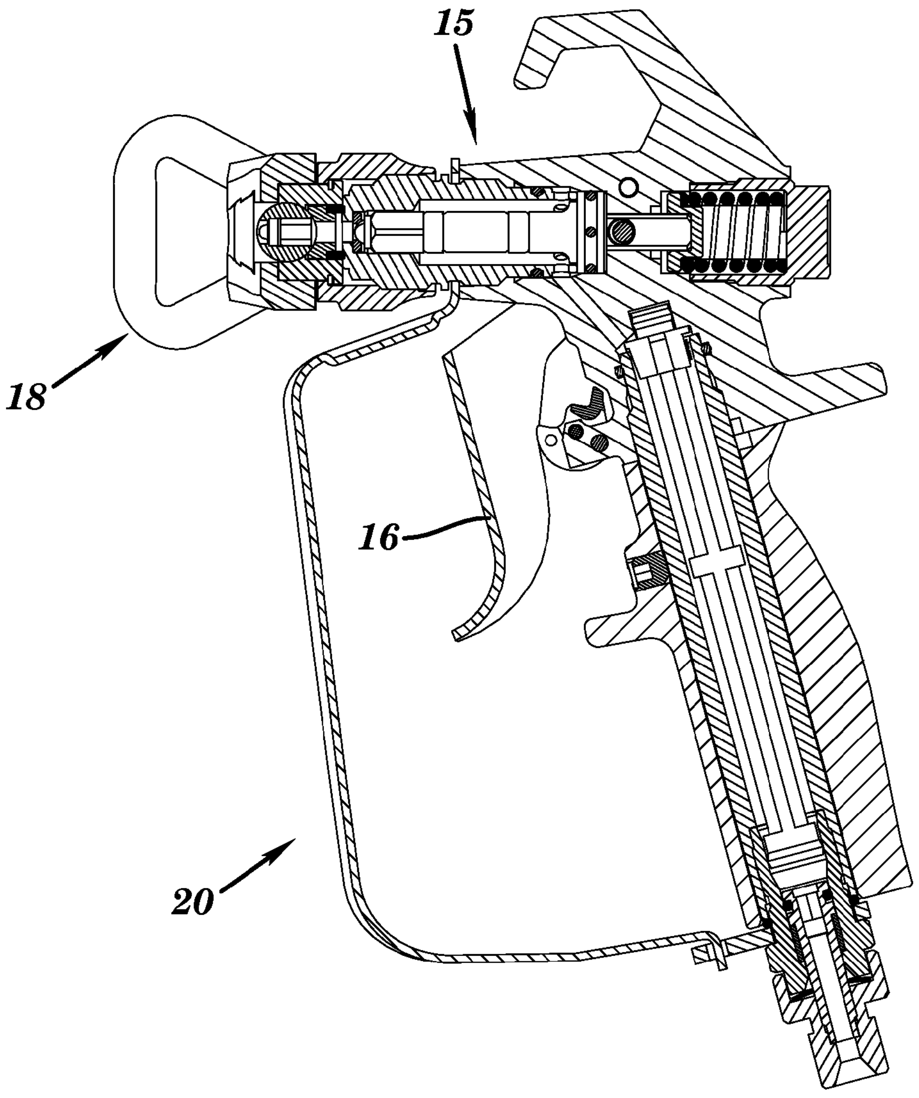
FIG. 1 is a cross-section of the front end of a spray gun utilizing the instant invention.
Figure 2:
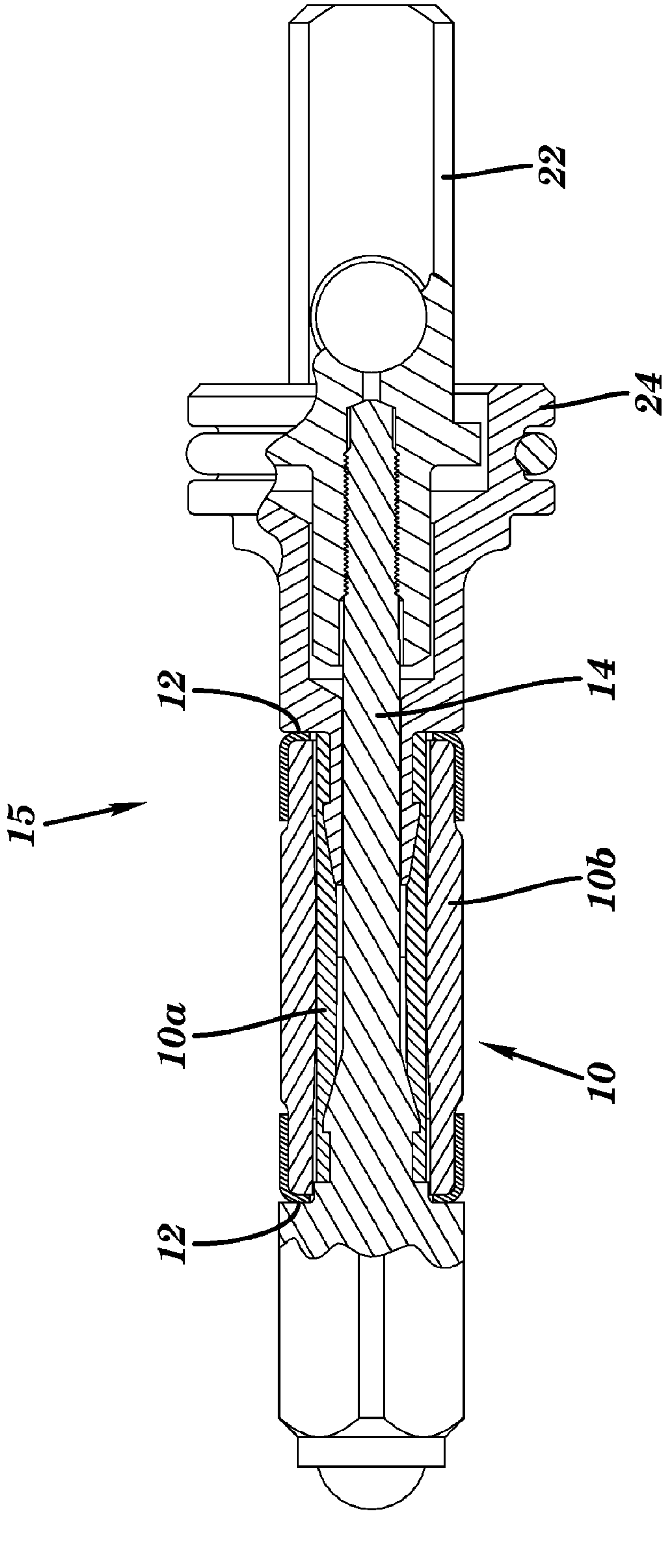
FIG. 2 is a cross-section of the needle assembly utilizing the instant invention.
Figure 3:
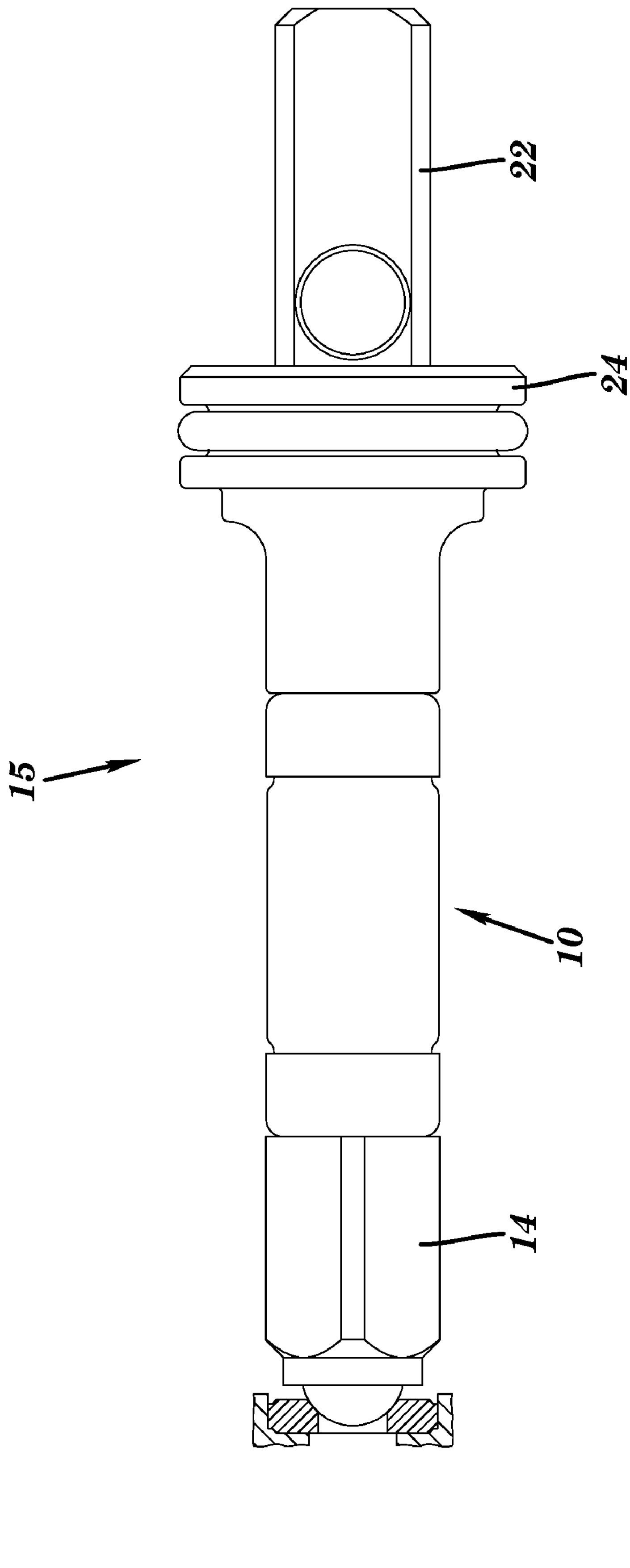
FIG. 3 is a simplified cross-section of the seal in the closed position.
Figure 4:
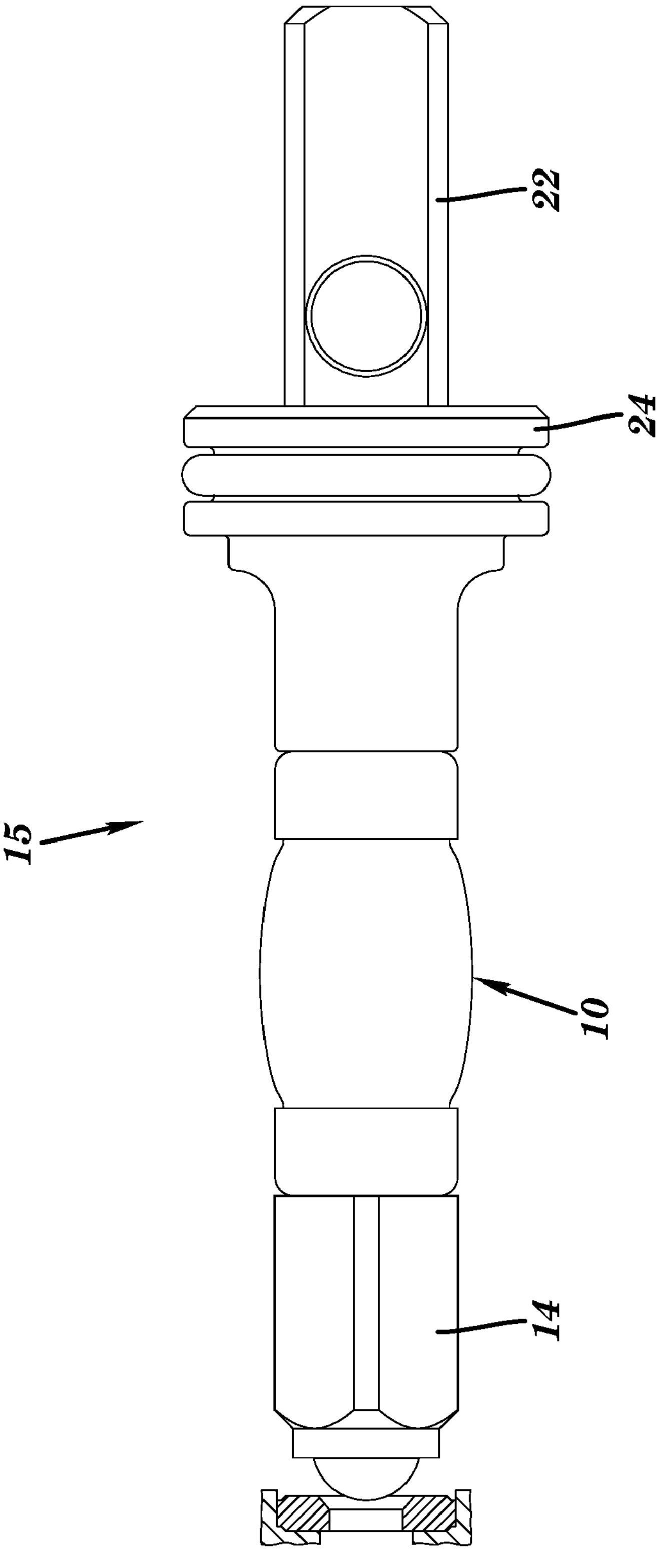
FIG. 4 is a simplified cross-section of the seal in the open position.
Figure 5:
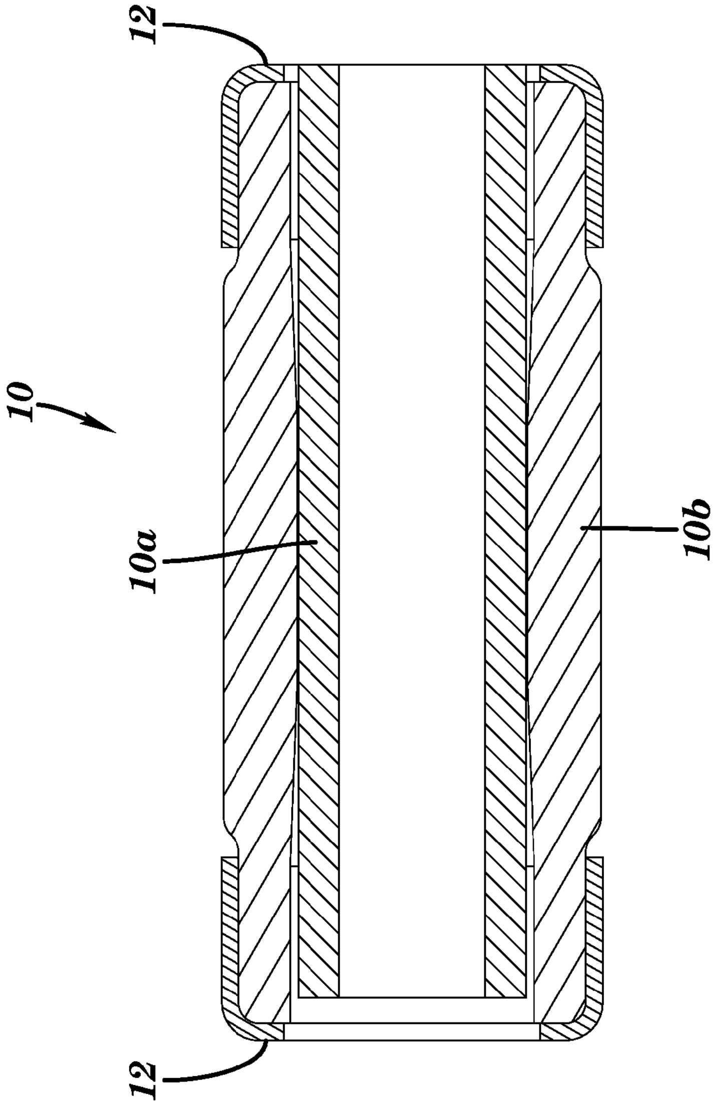
FIG. 5 shows a cross-section of the seal of the instant invention.

The seal 10 is placed in compression between two generally parallel surfaces 12 so as to seal out the fluid (such as paint) from the rod 14. As the trigger 16 is pulled and the rod 14 moved rearward (relative to the front/spraying end 18 of the gun 20), the seal 10 bulges to accommodate the travel as shown in FIG. 4. The rear end of needle 14 is threaded (or otherwise attached such as by welding or adhesive bonding) into needle actuator 22 which in turn is slideably located in seal housing 24.

It is contemplated that various changes and modifications may be made to the seal assembly without departing from the spirit and scope of the invention as defined by the following claims.

The invention claimed is:

1. A needle assembly configured for use in a spray gun comprising:

- a needle having a reduced dimension seal locating rod and an annular rearward facing seal retention portion;
- a tubular seal located over at least part of said seal locating rod; and
- a seal housing having an annular forward facing seal retention portion, said tubular seal being located between said annular facing seal retention portions said tubular seal having first and second ends and being fixed relative to said needle at one of said ends and fixed relative to said housing at the other of said ends so as to bulge to accommodate travel of said rod as said rod is moved rearward relative to said seal housing.

2. The needle assembly of claim 1 wherein said seal comprises an inner tube and an outer tube.

3. The needle assembly of claim 2 wherein said inner tube comprises a polyethylene elastomer.

4. The needle assembly of claim 2 wherein said outer tube comprises a fluoroelastomer.

5. The needle assembly of claim 1 further comprising a needle actuator attached to said rod.

* * * * *